United States Patent
Yap et al.

(10) Patent No.: US 7,548,689 B2
(45) Date of Patent: Jun. 16, 2009

(54) IMAGE PROCESSING METHOD

(75) Inventors: Choon Hwee Yap, Singapore (SG); John M Baron, Longmont, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 311 days.

(21) Appl. No.: 11/787,007

(22) Filed: Apr. 13, 2007

(65) Prior Publication Data

US 2008/0253758 A1    Oct. 16, 2008

(51) Int. Cl.
G03B 7/093 (2006.01)
G03B 7/00 (2006.01)
H04N 5/238 (2006.01)
H04N 5/232 (2006.01)

(52) U.S. Cl. ............... 396/234; 396/153; 396/322; 348/208.13; 348/222.1; 348/362

(58) Field of Classification Search ............... 396/234
See application file for complete search history.

(56) References Cited

U.S. PATENT DOCUMENTS

| | | | |
|---|---|---|---|
| 6,204,881 B1 | 3/2001 | Ikeda et al. | |
| 6,496,226 B2 | 12/2002 | Takahashi et al. | |
| 7,061,524 B2 | 6/2006 | Liu et al. | |
| 7,098,946 B1 | 8/2006 | Koseki et al. | |
| 2002/0001464 A1* | 1/2002 | Ohsawa | 396/50 |
| 2004/0080652 A1* | 4/2004 | Nonaka et al. | 348/321 |
| 2005/0046708 A1* | 3/2005 | Lim et al. | 348/231.6 |
| 2005/0280733 A1 | 12/2005 | Imaizumi | |
| 2006/0114333 A1 | 6/2006 | Gokturk et al. | |
| 2006/0216015 A1* | 9/2006 | Shimizu | 396/157 |
| 2007/0296821 A1* | 12/2007 | Kakkori | 348/208.6 |
| 2008/0158398 A1* | 7/2008 | Yaffe et al. | 348/294 |

OTHER PUBLICATIONS

Grossberg, M. D. et al."High Dynamic Range from Multiple Images: Which Exposures to Combine?". ICCV Workshop on Color and Photometric Methods in Computer Vision (CPMCV), 2003.
Mann, S. et al., "On Being 'Undigital' with Digital Cameras: Extending Dynamic Range by Combining Differently Exposed Pictures", TR-323, May 1995.
http://www.tawbaware.com/imgstack/htm., downloaded Feb. 27, 2007.

* cited by examiner

Primary Examiner—W. B. Perkey
Assistant Examiner—Dennis Hancock

(57) ABSTRACT

In a method for processing an image, a scene to be captured is divided into multiple zones and statistical values for a plurality of the multiple zones are obtained. In addition, a short-exposure time and a long-exposure time from the statistical values of the plurality of zones are determined. A long-exposure frame is captured at the long-exposure time and a short-exposure frame is captured at the short-exposure time. The long-exposure frame and the short-exposure frame are combined into a combined image while correcting for motion estimated to have occurred between the long-exposure frame and the short-exposure frame, and the combined image is stored.

20 Claims, 4 Drawing Sheets

IMAGE PROCESSING METHOD

BACKGROUND

Charge coupled device (CCD) image sensors and complementary metal oxide semiconductor (CMOS) image sensors are often used in imaging devices, such as, digital cameras and digital video recorders, as image pick up apparatuses. These image sensors convert an optical image focused on the sensors into electrical signals, which represent the intensity of the image. The dynamic range of these imaging devices, however, is often limited due to the relatively low sensitivity of the photosensitive pixels contained in the image sensors.

The dynamic range of an image sensor measures how wide a range of lighting the image sensor can accurately capture. In many natural scenes, the dynamic range often exceeds three orders of magnitude, such as in a scene including a brightly lit section and a section containing shadows. This high dynamic range makes it difficult for the image sensor to accurately capture details of both the brightly lit section and the section containing shadows.

To increase the dynamic range of imaging sensors to capture a subject in low light conditions, the exposure time of the image sensor has been increased. Increasing the exposure time, however, increases the probability that the captured image will be susceptible to shaking of the imaging device. To overcome this problem, techniques in which image signals corresponding to two frames taken during different exposure times are combined to increase dynamic range have been proposed. Conventional techniques, however, require expensive components, complicated processing routines, or both, and are thus associated with relatively high costs.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein is a method for processing an image to extend the dynamic range of image sensors in image capture apparatuses. In other words, the disclosed method enables captured images to preserve areas that are relatively bright as well as areas that are relatively dark and therefore more accurately reproduce an image of a scene. In addition, the method enables the use of relatively common and inexpensive image sensors that have relatively limited sensitivity or dynamic range, thereby enabling the image capture apparatus to be manufactured at relatively lower costs while producing relatively high quality images. Also disclosed herein is an image capture apparatus configured to implement the method for processing an image to extend the dynamic range of image sensors.

Figure 1:
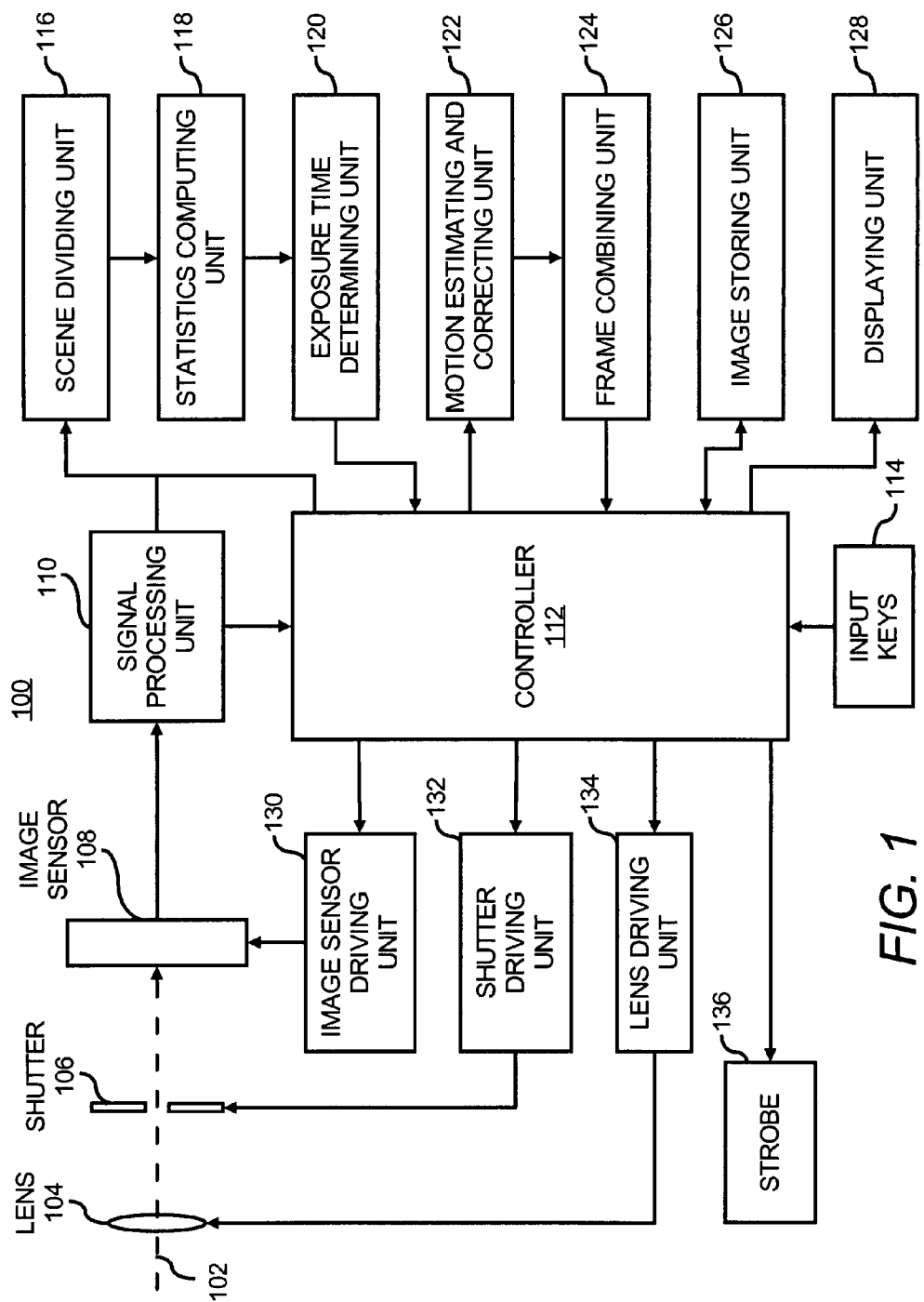
FIG. 1 shows a block diagram of an image capture apparatus configured to perform various functions described herein, according to an embodiment of the invention.

With reference first to FIG. 1, there is shown a block diagram of an image capture apparatus 100 configured to perform various functions described herein, according to an example. It should be understood that the following description of the image capture apparatus 100 is but one manner of a variety of different manners in which the image capture apparatus 100 may be configured. In addition, it should be understood that the image capture apparatus 100 may include additional components and that some of the components described herein may be removed and/or modified without departing from a scope of the image capture apparatus 100. For instance, the image capture apparatus 100 may include an A/D converter, an amplifier, etc.

The image capture apparatus 100, may comprise a digital still camera, a digital video camera, or a combination thereof, a digital device, such as, a cellular telephone containing a digital camera, etc. The image capture apparatus 100 includes a lens 104 through which object light 102 is received into the image capture apparatus 100. The object light 102 may be defined as including the light reflected from a scene that is to be captured by the image capture apparatus 100.

As shown in FIG. 1, the object light 102 passes through a shutter 106 prior to reaching an image sensor 108. The shutter 106 may include, for instance, a plurality of blades configured to be moved with respect to each to other to thereby vary an opening between the blades. In one respect, the shutter 106 is configured to control the amount of object light 102 that reaches the image sensor 108 by varying the length of time the image sensor 108 is exposed to the object light 102.

The image sensor 108 includes a charge coupled device (CCD) image sensor or a complimentary metal-oxide semiconductor (CMOS) image sensor. In either event, the image sensor 108 generally operates to convert the object light 102 into electrical signals which are proportional to the optical energy of the object light 102. In addition, the image sensor 108 is configured to input the electrical signals into a signal processing unit 110. The image capture apparatus 100 may include an A/D converter, an amplifier, etc., for instance, when the image sensor 108 comprises a CCD image sensor, prior to inputting the electrical signals into the signal processing unit 110.

The signal processing unit 110 performs signal processing, such as formation of luminance signals and color signals, on the input electrical signals. The signal processing unit 110 may also perform gamma correction, compression, and the like, on the input electrical signals.

The electrical signals processed by the signal processing unit 110 are inputted into a controller 112. The controller 112 may comprise any reasonably suitable processing device configured to perform various functions in the image capture apparatus 100. By way of example, the controller 112 may comprise a microprocessor, a micro-controller, an application specific integrated circuit (ASIC), or other suitable device capable of performing various functions in the image capture apparatus 100.

The controller 112 may also be configured to receive input from input keys 114. The input keys 114 generally represent elements through which a user may interface with the image capture apparatus 100 to, for instance, set various types of image capture modes, activate or deactivate various switches, etc.

In any regard, the controller 112 may input the image data received from the signal processing unit 110 into a scene dividing unit 116. Alternatively, however, the signal processing unit 110 may input the image data directly into the scene dividing unit 116. In any event, the scene dividing unit 116 may divide the image data such that the scene to be captured 202 is divided into multiple zones 204a-204n, for instance, as depicted in FIG. 2.

Figure 2:
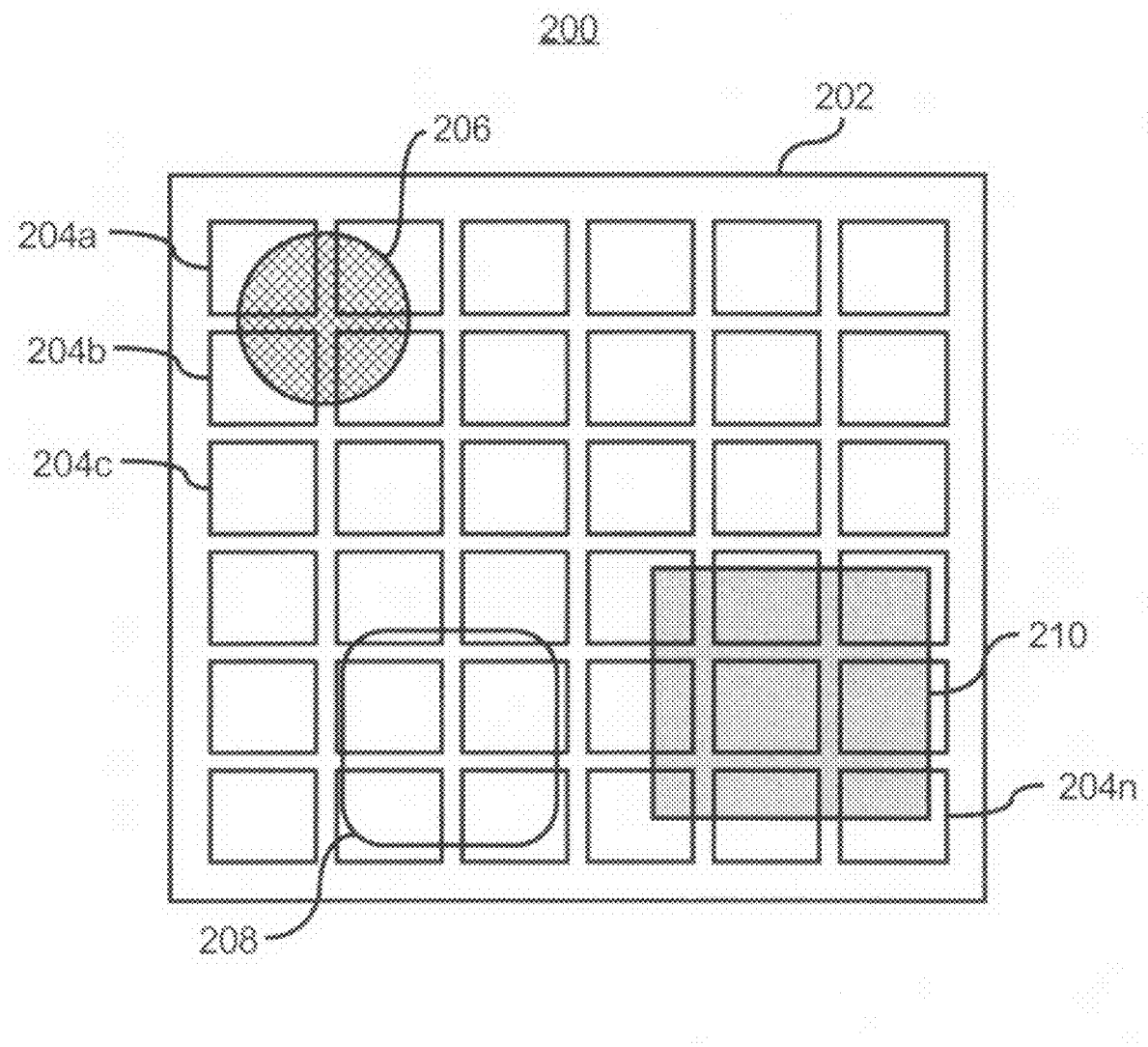
FIG. 2 shows a diagram of a scene to be captured, according to an embodiment of the invention.

FIG. 2, more particularly, depicts a diagram 200 of a scene to be captured 202, according to an example. As shown therein, the scene 200 includes a number of elements or objects 206-210. A first element 206 is intended to depict a relatively bright object, a second element 208 is intended to depict an object having a relatively normal brightness level, and a third element 210 is intended to depict a relatively dark object, such as, for instance, a shadow of an object or an object placed in a shadow.

The zones 204a-204n generally denote individual regions in the scene 202. Although the zones 204a-204n have been depicted as separated square boxes, it should be understood that the zones 204a-204n may comprise any other reasonably suitable shape, such as, triangles, circles, hexagons, octagons, or the like. In addition, it should be understood that the zones 204a-204n may be separated in a more conventional grid-like pattern and that the number of zones 204a-204n employed may vary as desired or needed, without departing from a scope of the image capture apparatus 100 disclosed herein.

With reference back to FIG. 1, the scene dividing unit 116 may input the divided scene 200 into a statistics computing unit 118. The statistics computing unit 118 may compute one or more statistical values with respect to some or all of the multiple zones 204a-204n. More particularly, the statistics computing unit 118 may compute statistical values that are descriptive of the objects, for instance, the objects 206-210, contained in individual zones 204a-204n. By way of example, the statistics computing unit 118 may compute the individual brightness levels of the zones 204a-204n. As another example, the statistics computing unit 118 may compute color information of the objects contained in the zones 204a-204n. As a further example, the statistics computing unit 118 may compute focus metric values, which may be employed in performing an auto-focus operation.

In any regard, the statistics computing unit 118 may input the computed statistical values into an exposure time determining unit 120. The exposure time determining unit 120 is generally configured to determine a short-exposure time and a long-exposure time from the statistical values computed by the statistics computing unit 118. More particularly, for instance, the exposure time determining unit 120 may compare the statistical values for each of the zones 204a-204n to determine the short-exposure time and the long-exposure time.

According to an example, the exposure time determining unit 120 may search through the zones 204a-204n to identify the highest brightness or intensity values. The exposure time determining unit 120 may also calculate a median intensity value that is representative of mid-tone or Zone 5 in the Zonal system. By way of illustrative example only, assuming an 8-bit bit-depth resolution image, the median intensity value is equal to 128. If the highest intensity value is determined to be 250, corresponding, for instance, to element 206 (FIG. 2), the exposure time determining unit 120 may derive the short-exposure time by obtaining the ratio of the median intensity value (128) divided by the highest intensity value (250), and by multiplying this ratio with the exposure time used in capturing the scene 200 (FIG. 2).

For the long-exposure time, the exposure time determining unit 120 may search through and obtain the lowest brightness or intensity values in the zones 204a-204n, in manners similar to those described above with respect to the short-exposure time. By way of illustrative example only, with the median intensity value being equal again to 128 and the lowest intensity value being determined to be 50, which may, for instance, correspond to element 210 in the scene 200 (FIG. 2). The exposure time determining unit 120 may determine the long-exposure time by multiplying the ratio (128/50) with the exposure time used in capturing the scene 200 (FIG. 2).

According to another example, the exposure time determining unit 120 may perform an auto-exposure operation using the zones 204a-204n having the highest and lowest intensity values. By way of example, the auto-exposure operation may use the zones containing element 206 (FIG. 2) to determine the short-exposure time. In addition, the auto exposure operation may be based upon the zones containing element 206 to compute an exposure time that results in a median intensity value for the element 206. Similarly for determining the long-exposure time, the auto exposure operation may be based upon the zones containing the element 210 (FIG. 2). Again, the auto exposure operation may use these zones to compute an exposure time that results in a median intensity value for the element 210.

Generally speaking, however, the exposure time determining unit 120 may determine the short-exposure time to be sufficiently short to substantially ensure that the pixel values in the zones 204a-204n having relatively brighter objects, such as the zones 204a-204c positioned around the first element 206, are not saturated nor require clipping. In addition, the exposure time determining unit 120 may determine the long-exposure time to be sufficiently long to substantially ensure that relatively darker objects, such as the zones 204n-z to 204n positioned around the third element 210, are adequately exposed. In other words, therefore, the exposure time determining unit 120 may determine substantially optimal exposure times for capturing the short-exposure frame and the long-exposure frame to generally ensure that the combined image contains a relatively wide dynamic range.

The exposure time determining unit 120 may provide the short-exposure time and the long-exposure time to the controller 112, as depicted in FIG. 1. In addition, the controller 112 may operate an image sensor driving unit 130 and a shutter driving unit 132 to capture at least one frame at the short-exposure time and at least one frame at the long-exposure time. More particularly, for instance, the controller 112 may control the length of time the shutter 106 remains open to equal the long-exposure time during capture of at least one long-exposure frame by the image sensor 108 and to control the length of time the shutter 106 remains open to equal the short-exposure time during capture of at least one short-exposure frame by the image sensor 108.

The controller 112 may optionally operate a lens driving unit 134 to vary the focal length of the object light 102 captured by the sensor 108, for instance, under a an auto-focusing operation. Operation of the lens driving unit 134 by the controller 112 may be optional because the lens 104 may in certain instances be manipulated manually by a user. In addition, the controller 112 may operate a strobe 136 to increase the amount of light cast on a scene 202 to be captured during capture of the short-exposure frame and the long-exposure frame.

The long-exposure frame and the short-exposure frame may be captured in relatively quick succession to thereby minimize the possibility of motion in either or both of the objects contained in the scene 202 and the image capture apparatus 100. According to an example, the image sensor 108 comprises a CMOS image sensor because the time required between the long-exposure frame and the short-exposure frame by CMOS image sensors may be significantly shorter than the time required by CCD image sensors.

The signal processing unit 110 may individually process the long-exposure frame and the short-exposure frame in manners as discussed above and may input the processed long-exposure frame and short-exposure frame into the controller 112. The signal processing unit 110 may also perform dark frame subtraction on the long-exposure frame and the short-exposure frame to reduce the sensor floor noise.

The controller 112 may store the image data pertaining to the long-exposure frame in a buffer, such as an image storing unit 126. In addition, or alternatively, the controller 112 may input the image data pertaining to the long-exposure frame into a motion estimating and correcting unit 122. The controller 112 may also store the image data pertaining to the short-exposure frame in the buffer, such as the image storing unit 126. In addition, or alternatively, the controller 112 may input the image data pertaining to the short-exposure frame into the motion estimating and correcting unit 122.

In any regard, the motion estimating and correcting unit 122 may determine whether there has been relative motion between the long-exposure frame and the short-exposure frame by, for instance, comparing blocks of pixels in the long-exposure frame with corresponding blocks of pixels in the short-exposure frame. The blocks of the pixels being compared may comprise pixels contained in the various zones 204a-204n discussed above with respect to FIG. 2.

In determining whether there has been motion, the motion estimating and correcting unit 122 may perform a search in which a block of pixels, such as, a zone 204a, in the long-exposure frame is differentiated from another block of pixels, such as, a corresponding zone 204a in the short-exposure frame. In addition, the motion estimating and correcting unit 122 may compute the sum of the absolute difference between the two blocks of pixels and may obtain motion vectors of the blocks of the pixels to register the long-exposure frame and the short-exposure frame.

In instances where there is inadequate spatial frequency information for a block of pixels, for instance, in a flat-field scene, the correlation of blocks may result in inaccurate motion vectors. In addition, registration of the two frames using inaccurate motion vectors may result in obvious image artifacts. In order to substantially avoid this problem, the motion estimating and correcting unit 122 may first scan the blocks of pixels to be correlated with each other for spatial frequency information prior to obtaining the motion vectors of the blocks of pixels.

By way of example, the motion estimating and correcting unit 122 may determine the spatial frequency information by calculating the standard deviation of the pixel values. A high standard deviation value generally indicates that a block of pixels has a varying spatial frequency whereas a low standard deviation generally indicates that the block of pixels has a relatively low spatial frequency. As another example, the motion estimating and correcting unit 122 may determine the spatial frequency information by using focus figure of merit (FOM) values calculated, for instance, by an auto-focusing system. A relatively high FOM value generally indicates that the block of pixels has a relatively high spatial frequency content while a relatively low FOM value generally indicates that the block of pixels has a relatively low spatial frequency content.

If the spatial frequency of a current block of pixels is relatively low, the motion estimating and correcting unit 122 may select to use a different block location to determine whether there has been motion between the two frames. The motion estimating and correcting unit 122 may, for instance, select to use a different zone 204a-204n in the divided scene 202 to estimate the motion.

According to an example, the motion estimating and correcting unit 122 may restrict performance of the motion estimation and registration to regions in proximity of saturated regions in the long-exposure frame. In one regard, the motion estimation and registration process may be restricted to these regions to substantially reduce estimation and registration errors arising from object motion in other parts of the scene 202.

In any regard, the motion estimating and correcting unit 122 may determine which of the pixels in the long-exposure frame are to be replaced with the pixels in the short-exposure frame as well as the level at which the replacement pixels are to be shifted in the short-exposure frame. The level of shift in the replacement pixels may be determined according to the displacement vectors.

According to another example, the motion estimating and correcting unit 122 may include an optical image stabilization system. The optical image stabilization system may implement a gyro system to detect camera motion and may compensate the image sensor 108 or the lens system for the detected motion. In other words, the motion estimating and correcting unit 122 may detect and compensate for motion such that a second frame is substantially prevented from shifting away from the optical axis of the first frame during capture of the second frame. In addition, various motion estimating and correcting techniques discussed above may also be implemented in conjunction with this example to estimate and correct for motion occurring in the scene.

In either example, the motion estimating and correcting unit 122 may also input the image data pertaining to the long-exposure frame and the short-exposure frame, along with the shifted replacement pixel data into the frame combining unit 124. The frame combining unit 124 may combine the long-exposure frame and the short-exposure frame. In one respect, the frame combining unit 124 may analyze the long-exposure frame for regions containing saturated pixels and may replace the saturated pixels with replacement pixels from the short-exposure frame. The replacement pixels from the short-exposure frame may be shifted according to the shifted replacement pixel data received from the motion estimating and correcting unit 122.

In addition, the frame combining unit 124 may apply a multiplier factor to scale the replacement pixel values prior to replacing the saturated long-exposure frame pixels. The multiplier factor may be calculated according to the following equation:

$$\text{Multiplier} = \text{long-exposure frame exposure time}/\text{short-exposure frame exposure time}. \quad \text{Equation (1)}$$

The combined long-exposure frame and short-exposure frame may thus have benefits of both the long-exposure frame and the short-exposure frame without the drawbacks associated with these individual frames. For instance, relatively dark regions in the combined image may be adequately exposed while relatively bright regions in the combined image may be unsaturated.

In addition, because of the longer integration time used in the long-exposure frame, the signals of the pixels in relatively dark regions may have substantially higher values than those obtained in the short-exposure frame, which has a shorter integration time. Therefore, the frame combining unit 124 may apply a relatively higher gain to the relatively darker regions, without an attendant rise in noise level. By way of example, image enhancement methods like Retinex with a setting defaulted to "high" may be utilized for the combined image, such that a stronger gain mask may be applied to substantially enhance the relatively darker regions. In certain instances, it may be possible to further increase the Retinex gain mask beyond the highest design value implemented for an imaging apparatus without risk of increasing the noise level.

In any regard, the frame combining unit 124 may input the combined image into the controller 112, the image storing unit 126, and/or the displaying unit 128. In addition, or alternatively, the frame combining unit 124 may input image data pertaining to the combined image into the controller 112 and the controller 112 may input the combined image into the image storage unit 126. The controller 112 may also output the combined image on the displaying unit 128.

In various instances, the bit-depths resulting from a scaling operation in which pixel values for saturated regions in the long-exposure frame using corresponding pixel values from the short-exposure frame are higher than the image sensor 108 maximum bit-depth. This results in the combined image having a relatively larger dynamic range than what the image sensor 108 is designed to provide. In addition, many output devices, such as, displays and printers, also have relatively lower dynamic ranges. According to an example, the signal processing unit 110 is configured to remap the input electrical signals of the long-exposure frame and the short-exposure frame such that they have relatively smaller bit-depths. The signal processing unit 110 may remap the input electrical signals through use of various techniques, such as, fixed or adaptive tone curves.

In addition, for example, the high dynamic range raw image combined by the frame combining unit 124 may be remapped into a smaller bit-depth resolution. By way of example, the combined image may be remapped through use of a linear tone curve, such as, the gamma of 1.

According to an example, a process of determining the highest pixel value in the combined image may be performed to substantially optimize the mapping process. This process may include searching for the highest group pixel values in the combined image, which may be used as a scaling limiter in the mapping process. As such, for instance, the highest useful value in the combined image may be linearly scaled to the corresponding maximum value in the 12 bit space to substantially prevent flattening or compressing the scaled image tonal range.

The units 110, 116-128 may comprise hardware components, software modules or combinations thereof. By way of example, one or more of the units 110, 116-134 may comprise circuits or computer chips configured to perform their variously described functions. As another example, one or more of the units 110, 116-128 may comprise software modules which the controller 112 may invoke or implement to perform their variously described functions.

In instances where one or more of the units 110, 116-128 comprise software modules, the units 110, 116-128 comprising software modules may be stored in a storage device (not shown) accessible by the controller 112. The storage device may comprise, for instance, volatile or non-volatile memory, such as DRAM, EEPROM, MRAM, flash memory, and the like. In addition, or alternatively, the units 110, 116-128 comprising software modules may be stored on a removable media, such as, a compact flash memory device, an SD memory device, a floppy disk, a CD-ROM, a DVD-ROM, or other optical or magnetic media.

The functionalities of one or more of the units 110, 116-128 may be combined into one or more of the other units 110, 116-128, without departing from a scope of the image capture apparatus 100. By way of example, the motion estimating and correcting unit 122 may comprise the same unit as the frame combining unit 124. Alternatively, the functionalities of one or more of the units 110, 116-128 may be separated into a plurality of units, without departing from a scope of the image capture apparatus 100. By way of example, the motion estimating and correcting unit 122 may comprise two separate units.

Figure 3:
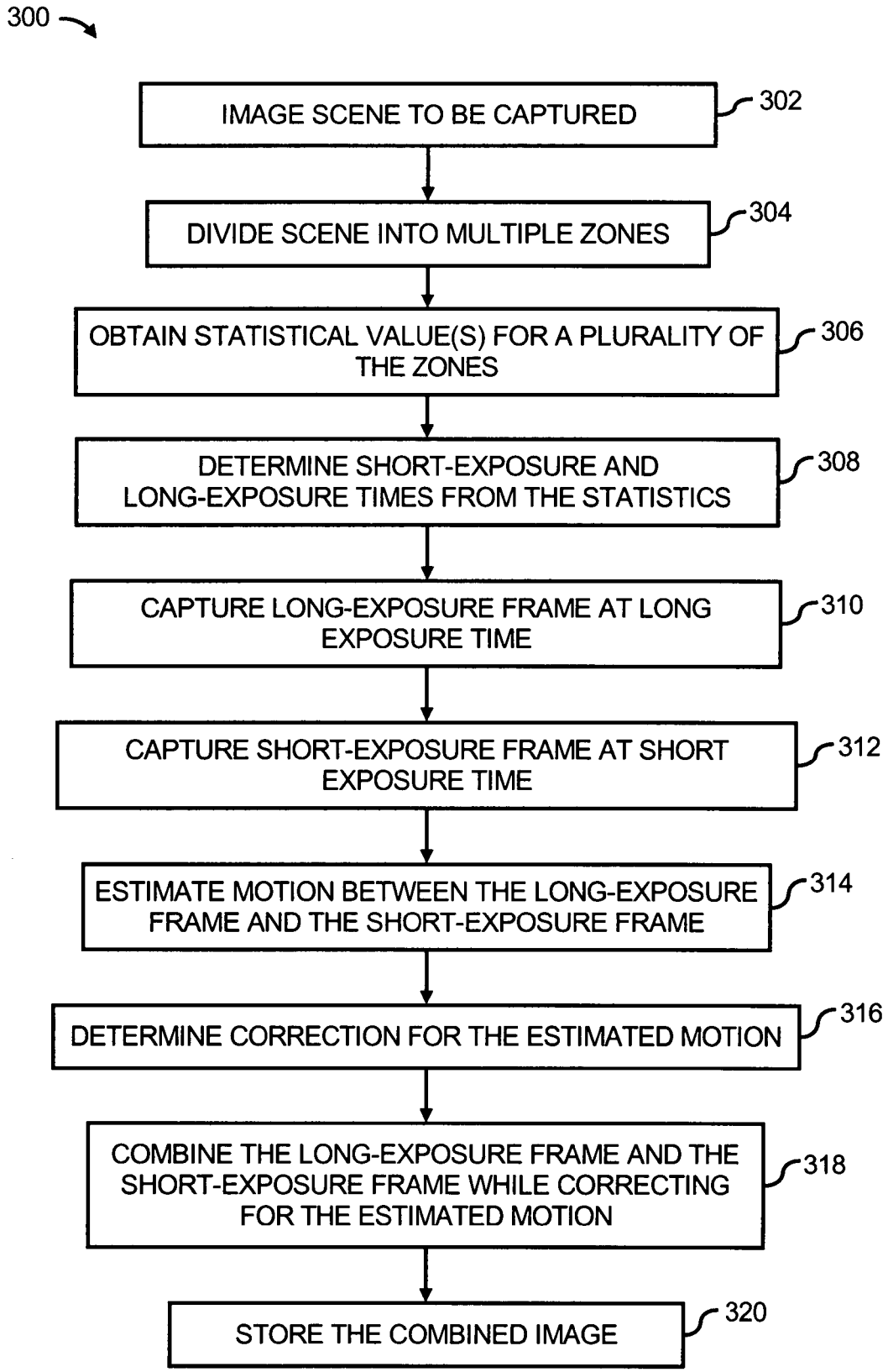
FIG. 3 depicts a flow diagram of a method for processing an image, according to an embodiment of the invention.

Various operations performed by the controller 112 and the units 116-134 of the image capture apparatus 100 will be described with regard to the flow diagram depicted in FIG. 3. FIG. 3, more particularly, depicts a flow diagram of a method 300 for processing an image, according to an example. It should be understood that the following description of the method 300 is but one manner of a variety of different manners in which such a method 300 may be implemented. In addition, it should be understood that the method 300 may include additional steps and that some of the steps described herein may be removed and/or modified without departing from a scope of the method 300.

The following description of the method 300 is described with particular reference to the components depicted in FIG. 1. It should, however, be understood that the method 300 may be performed by an image capture apparatus whose components differ from or comprise variations of the components depicted in FIG. 1, without departing from a scope of the method 300.

Generally speaking, the method 300 may be implemented in an image capture apparatus 100 to enable a scene to be imaged with a relatively high dynamic range and without a substantial amount of blurring. As such, the method 300 may be implemented to accurately capture scenes having both relatively bright regions as well as relatively dark regions.

The method 300 may be performed automatically by the image capture apparatus 100 each time an image of a scene is to be captured. Alternatively, the controller 112 may activate/deactivate the method 300 automatically, for instance, depending on the level of dynamic range contained in a scene to be captured. As another example, the method 300 may comprise a feature of the image capture apparatus 100 that a user may activate/deactivate.

At step 302, the image capture apparatus 100 images a scene to be captured. In other words, the image capture apparatus 100 is placed in a position and focus setting to capture an intended scene.

At step 304, the scene dividing unit 116 receives the scene to be captured and divides the scene into multiple zones 204a-204n (FIG. 2). In addition, at step 306, the statistics computing unit 118 computes one or more statistical values with respect to a plurality of the multiple zones 204a-204n. As discussed above, the one or more statistical values may comprise statistical values of the objects 206-210 contained in the zones 204a-204n.

At step 308, the exposure time determining unit 120 determines a short-exposure time and a long-exposure time from the statistical values computed by the statistics computing unit 118. The exposure time determining unit 120 may determine the exposure times in various manners as discussed above with respect to FIG. 1.

At step 310, the controller 112 operates the image sensor driving unit 130 and the shutter driving unit 132 to capture a long-exposure frame at the long-exposure time. In addition, at step 312, the controller 112 operates the image sensor driving unit 130 and the shutter driving unit 132 to capture a short-exposure frame at the short-exposure time. The long-exposure frame and the short-exposure frame captured at steps 312 and 314 may be stored in a buffer, such as, the image storing unit 126. In addition, the signal processing unit 110 may perform dark frame subtraction on the long-exposure frame and the short-exposure frame to reduce the image sensor 108 floor noise.

At step 314, the motion estimating and correcting unit 122 estimates motion between the long-exposure frame and the short-exposure frame. According to a first example, the motion estimating and correcting unit 122 may include an optical image stabilization system that uses a gyro system for detecting motion of the image capture apparatus 100. The motion estimating and correcting unit 122 may compensate for the detected motion by substantially preventing a second frame from shifting away from an optical axis of the first frame. In this example, the motion estimating and correcting unit 122 may automatically stabilize the second frame with respect to the first frame and may thus correct for estimated motion between the frames at step 316.

According to another example, the motion estimating and correcting unit 122 may estimate relative motion between the long-exposure frame and the short-exposure frame by, for instance, comparing blocks of pixels in the long-exposure frame with corresponding blocks of pixels in the short-exposure frame. In this example, the motion estimating and correcting unit 122 may obtain motion vectors of the blocks of pixels and may determine how the blocks of pixels are to be modified to compensate for the estimated motion, at step 316.

In estimating whether there has been relative motion, the motion estimating and correcting unit 122 may first scan the blocks of pixels to be correlated with each other for spatial frequency information prior to obtaining the motion vectors of the blocks of pixels. In addition, the motion estimating and correcting unit 122 may select blocks of pixels having sufficient levels of spatial frequency information to perform the motion comparison. The motion estimating and correcting unit 122 may perform these operations to substantially ensure that the blocks of pixels being compared have a sufficient level of spatial frequency information for an accurate determination of motion to be made.

In addition, or alternatively, the motion estimating and correcting unit 122 may restrict performance of the motion estimation and registration to regions in proximity of saturated regions in the long-exposure frame. By way of example, the motion estimating and correcting unit 122 restricts performance of the motion estimation and correction process to the zones 204a-204n containing saturated objects, to the zones 204a-204n adjacent to the zones 204a-204n containing saturated objects, etc.

The frame combining unit 124 combines the long-exposure frame and the short-exposure frame while correcting for the estimated motion, as indicated at step 318. As discussed above, the frame combining unit 124 replaces saturated pixels in the long-exposure frame with corresponding replacement pixels from the short-exposure frame. The corresponding replacement pixels may be shifted as necessary based upon the correction determined by the motion estimating and correcting unit 122. In addition, the frame combining unit 124 may apply a multiplier factor to scale the corresponding replacement pixels.

At step 320, the image comprised of the combination of the long-exposure frame and the short-exposure frame may be stored in the image storing unit 126. In addition, or alternatively, the combined image may be stored in a removable storage device or in a storage device external to the image capture apparatus 100. As a further example, the combined image may be transmitted outside of the image capture apparatus 100 to a printing device, a computing device, etc., over a cable, a network, etc. As a yet further example, the combined image may be displayed on the displaying unit 128 to, for instance, enable users to view the combined image.

Figure 4:
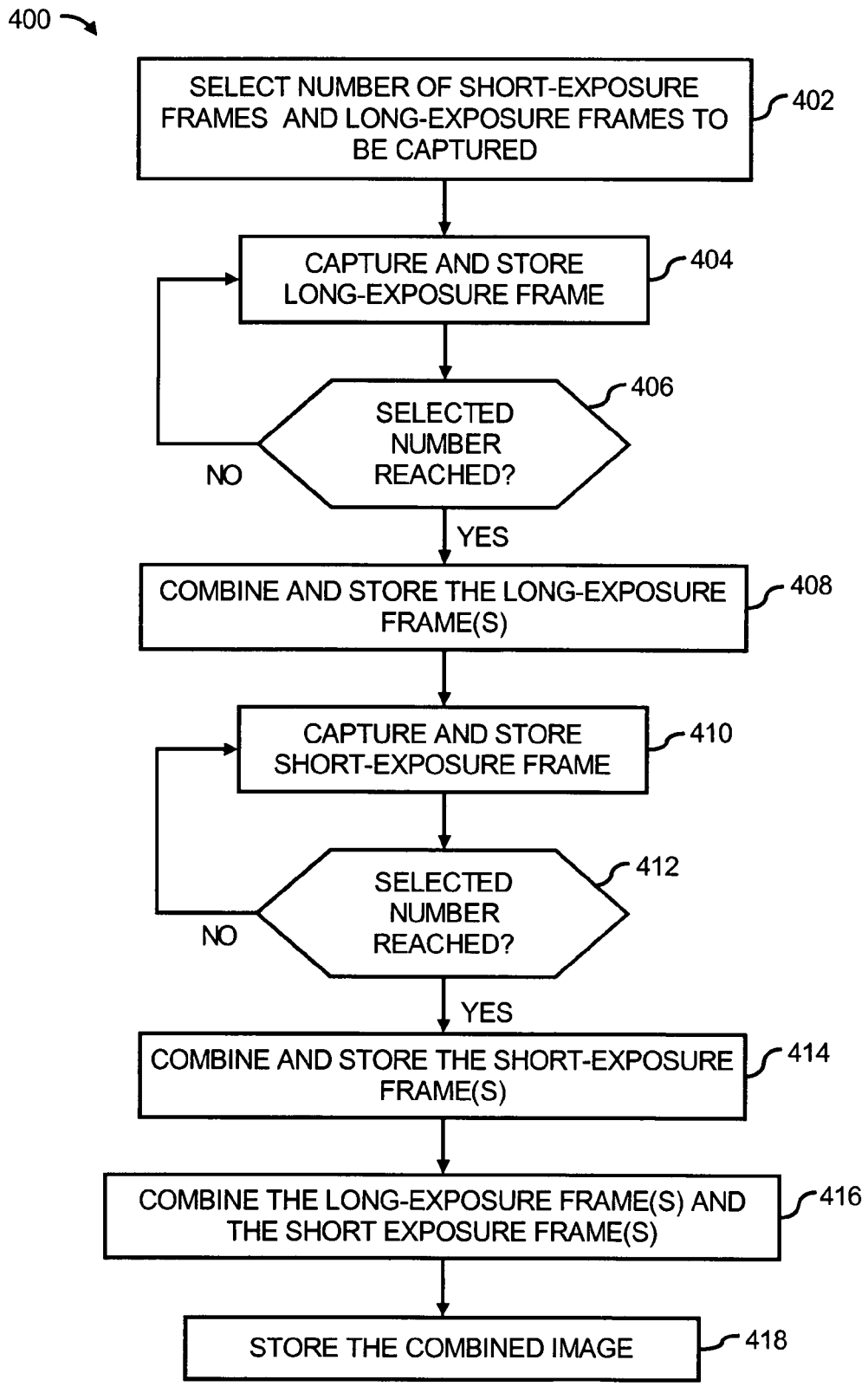
FIG. 4 depicts a flow diagram of a method for imaging scenes under relatively low light conditions, according to an embodiment of the invention.

With reference now to FIG. 4, there is shown a flow diagram of a method 400 for imaging scenes under relatively low light conditions, according to an example. It should be understood that the following description of the method 400 is but one manner of a variety of different manners in which such a method 400 may be implemented. In addition, it should be understood that the method 400 may include additional steps and that some of the steps described herein may be removed and/or modified without departing from a scope of the method 400.

In various instances, a strobe, such as the strobe 136, may be triggered once the exposure time exceeds a hand-held limit, which is typically around $\frac{1}{30}^{th}$ of a second. If, however, the strobe is forced off or is non-existent, the exposure time is typically increased beyond the hand-held limit to adequately expose the relatively low light scene. Alternatively, the ISO gain of the image sensor 108 may be increased while substantially restricting the exposure time to the hand-held limit; however, this approach typically results in excessive noise in the image.

In order to substantially avoid these problems, and according to another example, the image capture apparatus 100 performs the method 400 when capturing the frames at steps 312 and 314 (FIG. 3). In one regard, the image capture apparatus 100 may perform the method 400 to enable an image to be captured without exceeding the hand-held limit while adequately exposing the image in relatively low light conditions, without the use of the strobe 136. In addition, the method 400 may be implemented in conjunction with or as additional steps to the method 300.

At step 402, the exposure time determining unit 120 selects a number of short-exposure frames to be captured at a short-exposure time and a number of long-exposure frames to be captured at a long-exposure time. The number of short-exposure frames to be captured is equivalent to, for instance, the number of frames required to reach the short-exposure time determined at step 308 without exceeding the hand-held limit in any one of the short-exposure frames. In addition, the number of long-exposure frames to be captured is equivalent to, for instance, the number of frames required to reach the long-exposure time determined at step 306 without exceeding the hand-held limit in any one of the long-exposure frames. The method 400, therefore, enables the combined long and short-exposure times to exceed the hand-held limit and therefore have sufficient exposure for low-light conditions, without exposing any of the long- and short-exposure frames beyond the hand-held limit and without the use of the strobe 136.

At step 404, the controller 112 operates the image sensor driving unit 130 and the shutter driving unit 132 to capture a long-exposure frame and stores the long-exposure frame in a first buffer. At step 406, the controller 112 determines whether the number of long-exposure frames selected at step 402 has been reached. If the selected number of long-exposure frames has not been reached, the controller 112 operates to capture another long-exposure frame and to store the another long-exposure frame in a second buffer. In addition, the controller 112 may repeat steps 404 and 406 for as many iterations as are necessary to reach the selected number of long-exposure frames.

Once the selected number has been reached, the frame combining unit 124 combines the long-exposure frames into a single long-exposure frame, which may be stored in a buffer, at step 408. Prior to combining the long-exposure frames, the motion estimating and correcting unit 122 estimates motion between the long-exposure frames and determines manners, as described above, in which one or more of the long-exposure frames are to be modified to compensate for the estimated motion. In addition, the frame combining unit 124 may modify one or more of the long-exposure frames to compensate for the estimated motion when the long-exposure frames are combined.

At step 410, the controller 112 operates the image sensor driving unit 130 and the shutter driving unit 132 to capture a short-exposure frame and stores the long-exposure frame in a buffer. At step 412, the controller 112 may determine whether the number of short-exposure frames selected at step 402 has been reached. If the selected number of short-exposure frames has not been reached, the controller 112 operates to capture another short-exposure frame and to store the another short-exposure frame in another buffer. In addition, the controller 112 may repeat steps 410 and 412 for as many iterations as are necessary to reach the selected number of short-exposure frames.

Once the selected number has been reached at step 412, the frame combining unit 124 combines the short-exposure frames into a single short-exposure frame, which may be stored in a buffer, at step 414. Prior to combining the short-exposure frames, the motion estimating and correcting unit 122 estimates motion between the short-exposure frames and determines manners in which one or more of the short-exposure frames are to be modified to compensate for the estimated motion, as discussed above. In addition, the frame combining unit 124 modifies one or more of the short-exposure frames to compensate for the estimated motion when the short-exposure frames are combined.

At step 416, the frame combining unit 124 combines the combined long-exposure frame with the combine short-exposure frame while compensating for relative motion between the combined frames as discussed above with respect to step 318 (FIG. 3). In addition, at step 418, the combined image may be stored.

According to a further example, in instances where the image capture apparatus 100 has relatively limited memory buffers, the image capture apparatus 100 may sum two frames together into a single image, which may be stored in a first buffer, thus freeing up a second buffer. Thus, for instance, multiple ones of the long-exposure frames captured at step 404 may be combined and stored at step 408 prior to the capture of an additional long-exposure frame. As such, a third captured frame, such as the additional long-exposure frame, may be stored in the second buffer prior to being summed with the first two frames and stored in the first buffer, thus freeing up the second buffer for subsequent frame captures. This process may be repeated until the effective exposure time for the scene has been reached.

The operations set forth in the methods 300 and 400 may be contained as a utility, program, or subprogram, in any desired computer accessible medium. In addition, the methods 300 and 400 may be embodied by a computer program, which can exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method for processing an image, said method comprising:
   imaging a scene to be captured;
   dividing the scene into multiple zones;
   obtaining statistical values for a plurality of the multiple zones;
   determining a short-exposure time and a long-exposure time from the statistical values of the plurality of zones;
   capturing a long-exposure frame at the long-exposure time;
   capturing a short-exposure frame at the short-exposure time;
   combining the long-exposure frame and the short-exposure frame into a combined image while correcting for motion estimated to have occurred between the long-exposure frame and the short-exposure frame; and
   storing the combined image.

2. The method according to claim 1, wherein the plurality of zones includes at least one of a relatively brighter object, a relatively neutral object, and a relatively darker object, and wherein determining the short-exposure time from the statistical values further comprises selecting the short-exposure time to substantially ensure that pixel values in the zones having relatively brighter objects are not saturated nor require clipping.

3. The method according to claim 1, wherein the plurality of zones includes at least one of a relatively brighter object, a relatively neutral object, and a relatively darker object, and wherein determining the long-exposure time from the statistical values further comprises selecting the long-exposure time to substantially ensure that pixel values in the zones having relatively darker objects are adequately exposed.

4. The method according to claim 1, wherein determining the statistical values for the plurality of zones further comprises obtaining statistical values for the plurality of zones independently of others of the plurality of zones.

5. The method according to claim 1, wherein determining the statistical values for the plurality of zones further comprises obtaining brightness values for the plurality of zones, and wherein determining the short-exposure time and the long-exposure time further comprises determining the short-exposure time and the long-exposure time from the brightness values of the plurality of zones.

6. The method according to claim 1, further comprising:
estimating motion in at least one block of pixels between the long-exposure frame and a corresponding block of pixels in the short-exposure frame; and
wherein combining the long-exposure frame and the short-exposure frame further comprises compensating for the estimated motion in the at least one block of pixels while combining the long-exposure frame and the short-exposure frame.

7. The method according to claim 6, further comprising:
scanning the plurality of zones for at least one block of pixels having a relatively high spatial frequency; and
wherein estimating motion in at least one block of pixels further comprises estimating motion in the at least one block of pixels having the relatively high spatial frequency.

8. The method according to claim 1, further comprising:
scanning the long-exposure frame for saturated pixels;
determining values of pixels in the short-exposure frame corresponding to the saturated pixels in the long-exposure frame; and
wherein combining the long-exposure frame and the short-exposure frame further comprises replacing the saturated pixels in the long-exposure frame with the values of the corresponding pixels in the short-exposure frame.

9. The method according to claim 8, further comprising:
obtaining a multiplier factor configured to scale the corresponding pixels in the short-exposure frame to replace the saturated pixels in the long-exposure frame to a correct magnitude; and
wherein combining the long-exposure frame and the short-exposure frame further comprises applying the multiplying factor to the corresponding pixels in the short-exposure frame prior to replacing the saturated pixels in the long-exposure frame.

10. The method according to claim 1, further comprising:
performing a dark frame subtraction on both the long-exposure frame and the short-exposure frame to reduce sensor floor noise.

11. The method according to claim 1, further comprising:
remapping the combined image into a smaller bit-depth resolution.

12. The method according to claim 1, further comprising:
selecting a number of long-exposure frames to be captured, each of said long-exposure frames having an exposure time less than a hand-held limit;
selecting a number of short-exposure frames to be captured, each of said short-exposure frames having an exposure time less than the hand-held limit;
wherein capturing the long-exposure frame further comprises capturing a plurality of long-exposure frames equal to the selected number of long-exposure frames and combining the plurality of long-exposure frames into a single long-exposure frame;
wherein capturing the short-exposure frame further comprises capturing a plurality of short-exposure frames equal to the selected number of short-exposure frames and combining the plurality of short-exposure frames into a single short-exposure frame; and
wherein combining the long-exposure frame and the short-exposure frame further comprises combining the single long-exposure frame and the single short-exposure frame.

13. The method according to claim 12, further comprising:
capturing a first long-exposure frame of the plurality of long-exposure frames;
storing the first long-exposure frame in a first buffer;
capturing a second long-exposure frame of the plurality of long-exposure frames;
storing the second long-exposure frame in a second buffer;
combining the first long-exposure frame and the second long-exposure frame;
storing the combined first long-exposure frame and second long-exposure frame in the first buffer; and
capturing a third long-exposure frame of the plurality of long-exposure frames; and storing the third long-exposure frame in the second buffer.

14. An image capture apparatus comprising:
an image sensor configured to convert light from a scene into electrical signals;
a signal processing unit for processing the electrical signals;
a scene dividing unit for dividing the scene into multiple zones;
a statistics computing unit for computing independent statistical values for a plurality of the multiple zones;
an exposure time determining unit for determining a short-exposure time and a long-exposure time from the statistical values of the plurality of zones;
a controller for capturing a long-exposure frame at the long-exposure time and for capturing a short-exposure frame at the short-exposure time;
a motion estimating and correcting unit for estimating motion between the long-exposure frame and the short-exposure frame and for determining a correction for the estimated motion; and
a frame combining unit for combining the long-exposure frame and the short-exposure frame while applying the correction for the estimated motion to obtain a combined image.

15. The image capture apparatus according to claim 14, wherein the statistics computing unit is configured to select the short-exposure time to substantially ensure that pixel values in the zones having relatively brighter objects are not saturated nor require clipping and to select the long-exposure time to substantially ensure that pixel values in the zones having relatively darker objects are adequately exposed.

16. The image capture apparatus according to claim 14, wherein the frame combining unit is configured to scan the long-exposure frame for saturated pixels, to determine values of pixels in the short-exposure frame corresponding to the saturated pixels, and to replace the saturated pixels with the corresponding pixel values from the short-exposure frame in combining the long-exposure frame and the short-exposure frame.

17. The image capture apparatus according to claim 14, wherein the exposure time determining unit is configured to select a number of long-exposure frames to be captured, each of said long-exposure frames having an exposure time less than a hand-held limit, to select a number of short-exposure frames to be captured, each of said short-exposure frames having an exposure time less than the hand-held limit, and wherein the controller is further configured to capture a plurality of long-exposure frames equal to the selected number of long-exposure frames, wherein the plurality of long-exposure frames are configured to be combined into a single long-exposure frame, to capture a plurality of short-exposure frames equal to the selected number of short-exposure frames, wherein the plurality of short-exposure frames are configured to be combined into a single short-exposure frame, and wherein the frame combining unit is configured to combine the single long-exposure frame and the single short-exposure frame to obtain the combined image.

18. A computer readable storage medium on which is embedded one or more computer programs, said one or more computer programs implementing a method for processing an image, said one or more computer programs comprising a set of instructions for:

imaging a scene to be captured;

dividing the scene into multiple zones;

obtaining independent statistical values for a plurality of the multiple zones;

determining a short-exposure time and a long-exposure time from the independent statistical values of the plurality of zones, said short-exposure time being selected to substantially ensure that pixel values in the zones having relatively brighter objects are not saturated nor require clipping and said long-exposure time being selected to substantially ensure that pixel values in zones having relatively darker objects are adequately exposed;

capturing a long-exposure frame at the long-exposure time;

capturing a short-exposure frame at the short-exposure time;

combining the long-exposure frame and the short-exposure frame into a combined image while correcting for motion estimated to have occurred between the long-exposure frame and the short-exposure frame; and storing the combined image.

19. The computer readable medium according to claim 18, further comprising a set of instructions for:

scanning the long-exposure frame for saturated pixels;

determining values of pixels in the short-exposure frame corresponding to the saturated pixels in the long-exposure frame; and wherein combining the long-exposure frame and the short-exposure frame further comprises replacing the saturated pixels in the long-exposure frame with the values of the corresponding pixels in the short-exposure frame.

20. The computer readable medium according to claim 18, further comprising a set of instructions for:

selecting a number of long-exposure frames to be captured, each of said long-exposure frames having an exposure time less than a hand-held limit;

selecting a number of short-exposure frames to be captured, each of said short-exposure frames having an exposure time less than the hand-held limit;

wherein capturing the long-exposure frame further comprises capturing a plurality of long-exposure frames equal to the selected number of long-exposure frames and combining the plurality of long-exposure frames into a single long-exposure frame;

wherein capturing the short-exposure frame further comprises capturing a plurality of short-exposure frames equal to the selected number of short-exposure frames and combining the plurality of short-exposure frames into a single short-exposure frame; and wherein combining the long-exposure frame and the short-exposure frame further comprises combining the single long-exposure frame and the single short-exposure frame.

* * * * *